June 30, 1953 — O. W. SMITH — 2,643,890
TANDEM TRAILER DEVICE
Filed April 19, 1950 — 3 Sheets-Sheet 1
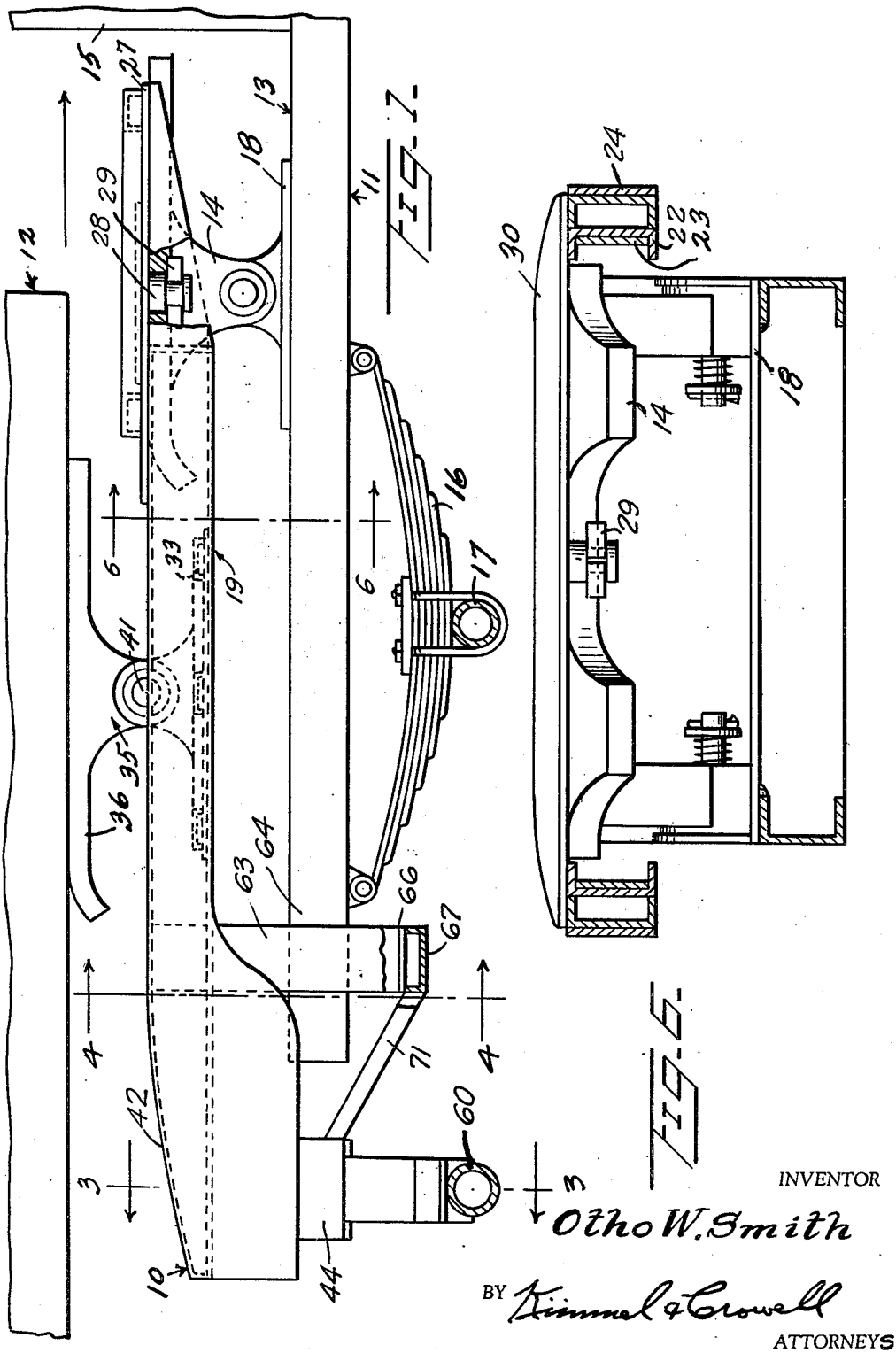
INVENTOR
Otho W. Smith
BY Kimmel & Crowell
ATTORNEYS June 30, 1953 — O. W. SMITH — 2,643,890
TANDEM TRAILER DEVICE
Filed April 19, 1950 — 3 Sheets-Sheet 2
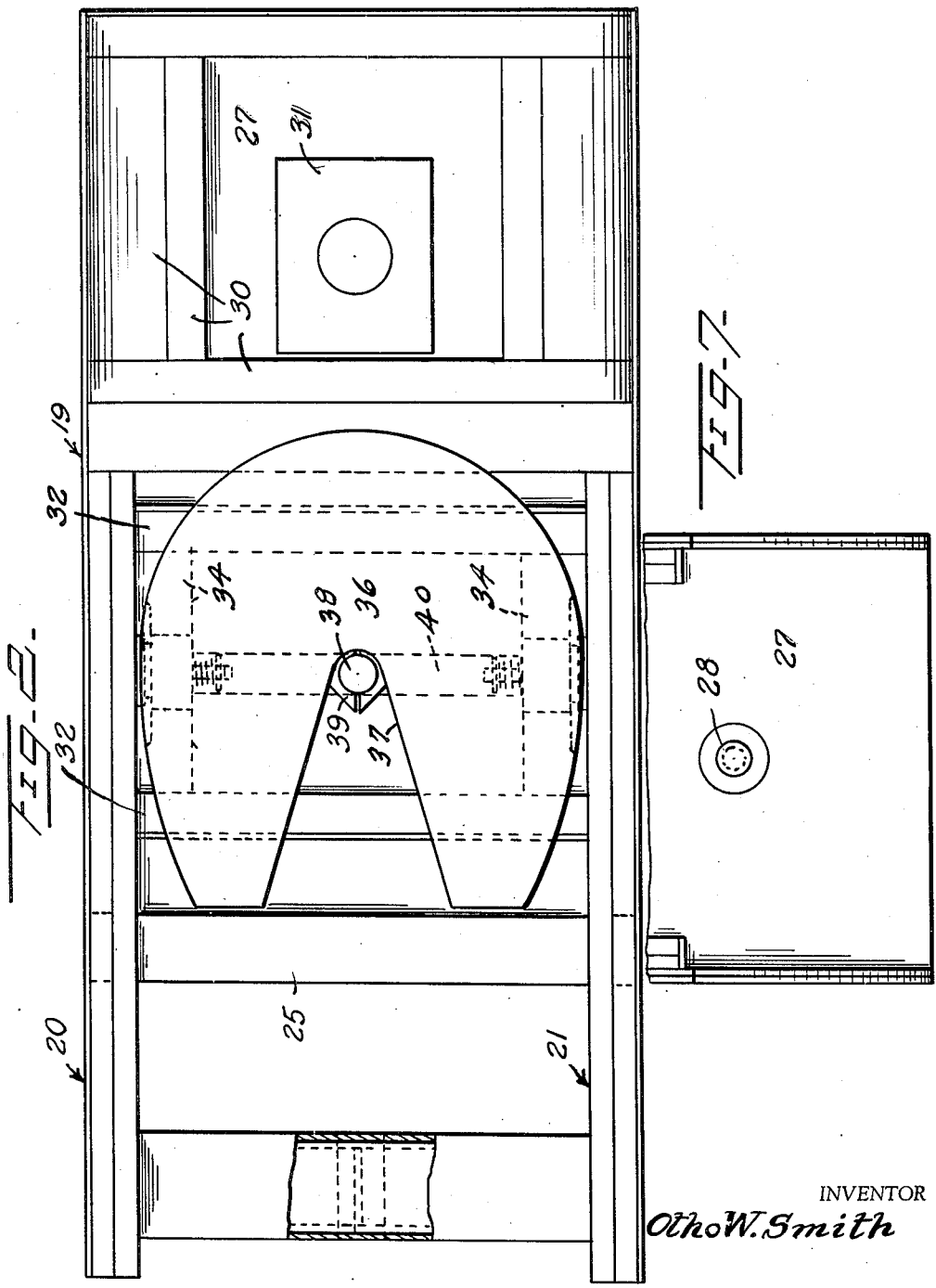
INVENTOR
Otho W. Smith
BY
Kimmel & Crowell ATTORNEYS

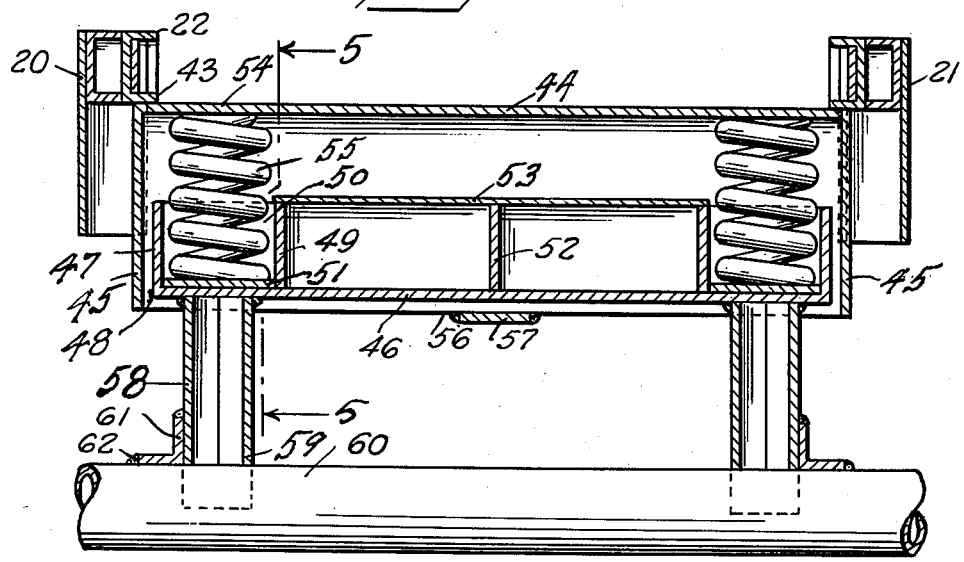
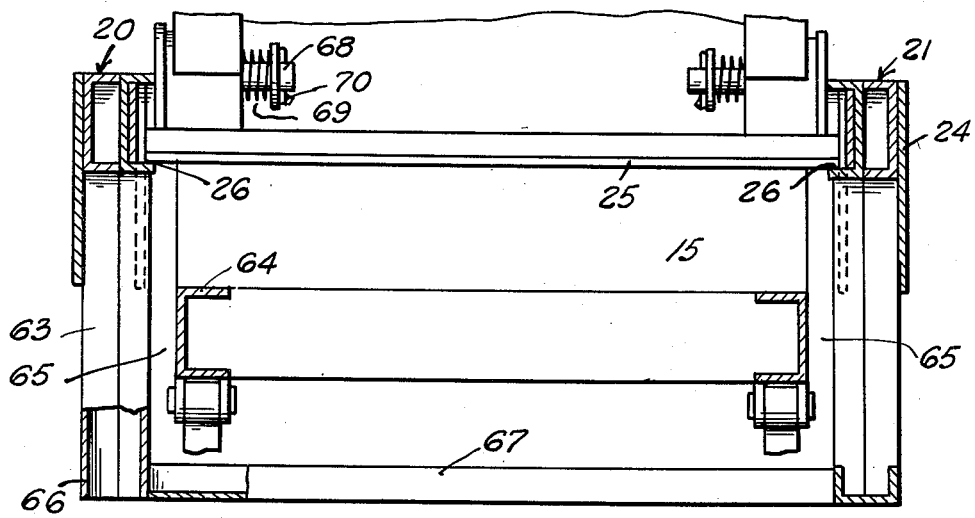
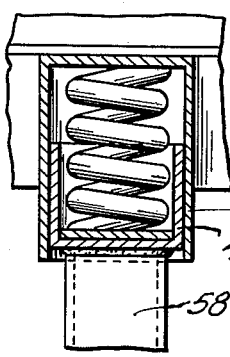

Patented June 30, 1953

2,643,890

UNITED STATES PATENT OFFICE 2,643,890

TANDEM TRAILER DEVICE

Otho Wayne Smith, Bedford, Ind.

Application April 19, 1950, Serial No. 156,783

3 Claims. (Cl. 280—33.05)

This invention relates to a tractor-trailer connector and more particularly a flexible trailer connecting unit having a relatively low fifth wheel carried by an auxiliary axle for connection to the back of a tractor.

Most all present day heavy trucking loads are carried in detachable trailer units provided with a fifth wheel pivot mount at a front end spaced from the rear wheels and adapted for supported connection to an automotive tractor equipped with a receiving mount. Such fifth wheel connections allow for quick connection and disconnection of a tractor to and from different trailers. However, these mounts have the disadvantage that in order to provide clearance for turning and normal misalignment of the trailer relative to the tractor in traversing irregularities in the road and around curves they must be mounted a considerable distance above the tractor frame which often times causes the front of the trailer to exceed the overhead clearance available at certain points traversed such as highway bridges and underpass construction. Another characteristic of the conventional tractor-trailer combination is that a large amount of the trailer load is carried by the tractor which concentrates considerable weight on the rear wheels of the tractor so that there is a tendency for a normally loaded trailer to cause the combination to exceed the maximum axle load permitted on the highways of most States.

Therefore it is one of the objects of the present invention to provide a supplemental dolly-like unit for connection to a tractor having a load supporting axle disposed behind the driving axle of said tractor with a relatively low fifth wheel carried by the unit and adapted to support the front end of a trailer.

A further object is to provide an additional load bearing axle in a tractor-trailer unit positioned relative to the trailer load so as to assume a predetermined amount of weight.

A still further object is to provide an axle supporting unit connecting a trailer to a tractor having spaced dependent side members engageable with the rear end of the tractor to limit angular movement thereof so as to prevent any tendency of "jackknifing."

Another object is to provide a coil spring mounting means having rectangular telescoping mounts in a tractor connecting unit.

Another object is to provide a more uniform spring suspension means for a tractor-trailer combination limited as to angular movement to prevent undesired sway on traversing curves.

Still another object is to provide a construction which is simple and durable and economical of manufacture and operation.

With the above and other objects in view as will appear as the description proceeds, my invention is comprised of the novel arrangement of parts, combination and details of construction disclosed in the drawings and specification, and defined in the appended claims.

In the drawings:

Figure 1 is a side elevation of the present invention shown in its preferred embodiment as a self-supporting connecting means extending between a trailer and tractor.

Figure 2 is a plan view of the frame.

Figure 3 is a section taken on line 3—3 of Figure 1.

Figure 4 is a section taken on line 4—4 of Figure 1.

Figure 5 is a fragmentary section taken on line 5—5 of Figure 3.

Figure 6 is a section taken on line 6—6 of Figure 1.

Figure 7 is partial plan view of the underside of the depending pin mount plate engageable with the fifth wheel of the tractor.

Referring now in detail to the drawings, in which like numbers refer to like parts in the different views, the device 10 of this invention consists of a self-contained wheeled unit adapted for attachment to an automotive tractor 11 to provide an intermediate connector between the tractor and the trailer 12. The tractor 11 as shown for illustrative purposes only is of conventional design having a rear frame portion 13 to which I attach a suitable fifth wheel tractor mount unit 14 spaced rearwardly of a tractor cab 15. The tractor 11 is provided with the usual type of spring means 16 engaging with a suitable axle 17 to which conventional wheels (not shown) are attached. The tractor fifth wheel mount 14 is secured to a cross plate 18 that extends transversely of the tractor frame 13 and is secured directly thereto by welding or other suitable means. I have found that the even keel-like operation attained with my connecting device 10 greatly reduces the clearance ordinarily required between the tractor frame and the load carried and attached to the tractor by a mount of this type so that in installing the unit of this invention on a conventional tractor I can position the mount plate 18 immediately adjacent the top of the tractor frame 13. This construction enables me to greatly reduce the top elevation or maximum vertical clearance that would otherwise be required for the trailer 12.

The device 10 is formed with a generally rectangular frame 19 as best illustrated in Figure 2. The frame 19 is formed with a pair of spaced side rails 20 and 21 formed with a plurality of channel members 22 reinforced by inner plates 23 and side plates 24 all joined together by welding or other suitable joining means. The side rails 20 and 21 are joined together by suitable cross members as at 25 having their ends secured to said side rails as at 26. Extending transversely of the frame at the front end is a horizontal plate 27 to which a conventional pivot pin 28 is dependently attached for engagement with the tractor mount 14. The pin 28 is adapted for being held in engaged position by a conventional lock means 29 The plate 27 being attached across the top of the rails 20 and 21 further assists in reducing the height of the trailer 12 when connected as shown by taking advantage of the space provided between the said rails which is of sufficient width to allow for angular movement of the frame 19 about the tractor mount 14. The plate 27 is reinforced by a plurality of channel and plate members 30 welded across the top thereof as best illustrated in Figure 2. Pin 28 is dependently supported by a suitable intermediate plate 31 welded to the cross plate 27.

Disposed rearwardly of the tractor mount plate 27 are a plurality of flat transverse supports 32 having opposite ends positioned within the side channels 22 along the lower edges thereof as at 33 (Figure 1). Supported by and weld attached thereto are spaced legs 34 of a second mount means 35 having a rockable table 36 of the same conventional type as of the tractor mount 14. The table 36 is provided with a conventional slot 37 adapted to center a pivot pin carried by the trailer 12 in aperture 38 locked in place by a conventional lock means 39. Additional reinforcing for the trailer mount 35 is provided by a connecting member 40 centered thereunder. This type of mounting allows me to drop the center line of the mount connecting pins 41 to a relatively low position adjacent the top of the frame 19.

The top surface of the frame is slightly inclined downwardly as at 42 rearwardly of the rockable mount 35 which allows for ready manipulation of the trailer into secured and supported position on the mount. Extending transversely of the side rails 20 and 21 and secured under the edges of the channels 22 as at 43 is a rectangular box-like spring supporting enclosure 44 formed with parallel sides 45 of a predetermined length sufficient to enclose a second rectangular box-like structure 46. The structure 46 is provided with spaced side walls 47 disposed inwardly from the sides 45 of the first enclosure 44 to provide sufficient clearance therebetween as at 48 to provide for a limited amount of side movement of box 46 relative to the enclosure. Box 46 is formed with intermediately disposed partition walls 49 spaced from the side walls 47 to provide spring sockets 50 at each end of the enclosed box 46. The bottom of each socket 50 is provided with a reinforcing member 51 disposed across the bottom of the socket and resting on the bottom of the enclosed box 46. The box 46 is preferably formed with a centered reinforcing member 52 and a top member 53. The enclosing box 44 is also formed with a top portion 54 extending over the sockets 50 between which top portion and the bottom of the box 46 within the sockets 50 are positioned suitable coil springs 55 as best illustrated in Figures 3 and 5. Springs 55 are positioned and dimensioned to carry a predetermined proportion of the trailer load with ample up and down movement being provided between their carrying members.

In Figure 5 is illustrated the front and rear positioning of the front and rear walls of the two box structures 44 and 46 telescopingly disposed relative to each other wherein a relatively close slide fit is provided therebetween so as to eliminate any tendency of the enclosed box 46 to rock within box 44. Across the bottom edges 56 of box 44 is placed a lateral member 57 which acts as a suitable means against complete withdrawal of box 46 on release of load. Dependent from box 42 are a pair of vertical supports 58 spaced apart and adapted for attachment at their free ends 59 to a transverse axle member 60. In order to provide for a more secure connection between the vertical supports 58 and axle 60 I provide additional reinforcing by angle members 61 disposed outwardly of the supports and welded in place as at 62. The axle 60 is of a conventional type suitable for mounting thereon of conventional wheels (not shown) capable of assuming part of the trailer load.

Extending downwardly from each of the side rails are a pair of dependent side members 63 of sufficient length and positioned between the axle 60 and the tractor mount pin 28 so as to engage with the rear end 64 of the tractor frame in case of unusual angular displacement of the frame 19 relative to the tractor frame 13. The relative spacing between the width of vertical members 63 and the width of the frame end 64 is sufficiently greater to provide enough clear space at each side of the tractor end as at 65 to allow for normal turning of the tractor as required for all normal road operations and parking. This provision of limited clearance as at 65 functions as a safety feature which prevents and overcomes any tendency of "jackknifing" which otherwise might be experienced in case of unusual angular movement.

Connected across between the free ends 66 of of the vertical members 63 is a cross member 67 that not only provides additional strengthening for the vertical members but also forms one side of a frame-like enclosure within which the end 64 of the tractor frame 13 can be readily inserted. The vertical members 63 are additionally braced by angularly disposed side braces 71 that extend from each of the ends 66 rearwardly and upwardly for welded engagement with the fixed rectangular box-like enclosure 44. As best illustrated in Figure 4 each of the mount means 14 and 35 are secured in place by suitable transverse pins 68 held under tension by an encircling compressed spring 69 bearing against a suitable plate and pin means as at 70.

Although I have explained the construction of my invention in detail in connection with the preferred embodiment it is to be understood that the invention is not to be limited thereby but is as defined in the appended claims and is to be considered comprehensive of all forms of structure coming within their scope.

I claim:

1. A device of the kind described comprising a frame having a pair of side members spaced apart to receive the end of a tractor frame inserted therebetween, a cross support fixed to said side members for engagement with a mount means carried by the tractor frame, said side members having a load support means disposed rearwardly of said mount, a vertical pivot member connecting said cross support to said mount, a pair of spring mounted supports dependably attached to said side members, an axle means attached to said mounts, and vertical guide members extending below said side members of the frame and spaced to each side of the tractor frame for engagement with either side thereof on the angle between said frame and the tractor exceeding a predetermined degree.

2. A connecting device for connecting a trailer to a tractor formed with an extended rear frame, and comprising a horizontal structure formed with an open end for insertion over the tractor frame end, a swivel support connecting said structure to the tractor frame, a rockable support adapted to rockably support the end of a trailer placed thereon, a transverse member carried by said horizontal structure having downwardly opening rectangular compartments disposed at each side of said structure, formed with horizontal top portions, rectangular plungers carried by each of said compartments having dependent ends disposed rearwardly of the tractor frame, an axle means carried by said ends, and spring means extending between said plungers and said top portions of the rectangular compartments.

3. A device of the kind described comprising a frame having a pair of side members spaced apart to receive the end of a tractor frame inserted therebetween, a cross support fixed to said side members for engagement with a mount means carried by the tractor frame, said side members having a load support means disposed rearwardly of said mount, a vertical pivot member connecting said cross support to said mount, a pair of spring mounted supports dependably attached to said side members, an axle means attached to said mounts, and vertical guide members extending below said side members of the frame and spaced to each side of the tractor frame for engagement with either side thereof on the angle between said frame and the tractor exceeding a predetermined degree, and a connecting bar extending between the lower ends of said vertical guide members.

OTHO WAYNE SMITH.

References Cited in the file of this patent

UNITED STATES PATENTS

| Number | Name | Date |
|---|---|---|
| 1,120,036 | Dearing | Dec. 8, 1914 |
| 2,351,151 | Sattler | June 13, 1944 |
| 2,417,019 | Sherman | Mar. 4, 1947 |

FOREIGN PATENTS

| Number | Country | Date |
|---|---|---|
| 677,022 | France | Dec. 7, 1929 |